J. W. LEDOUX.
FLUID METER.
APPLICATION FILED FEB. 4, 1916.
1,243,842.
Patented Oct. 23, 1917.
2 SHEETS—SHEET 1.
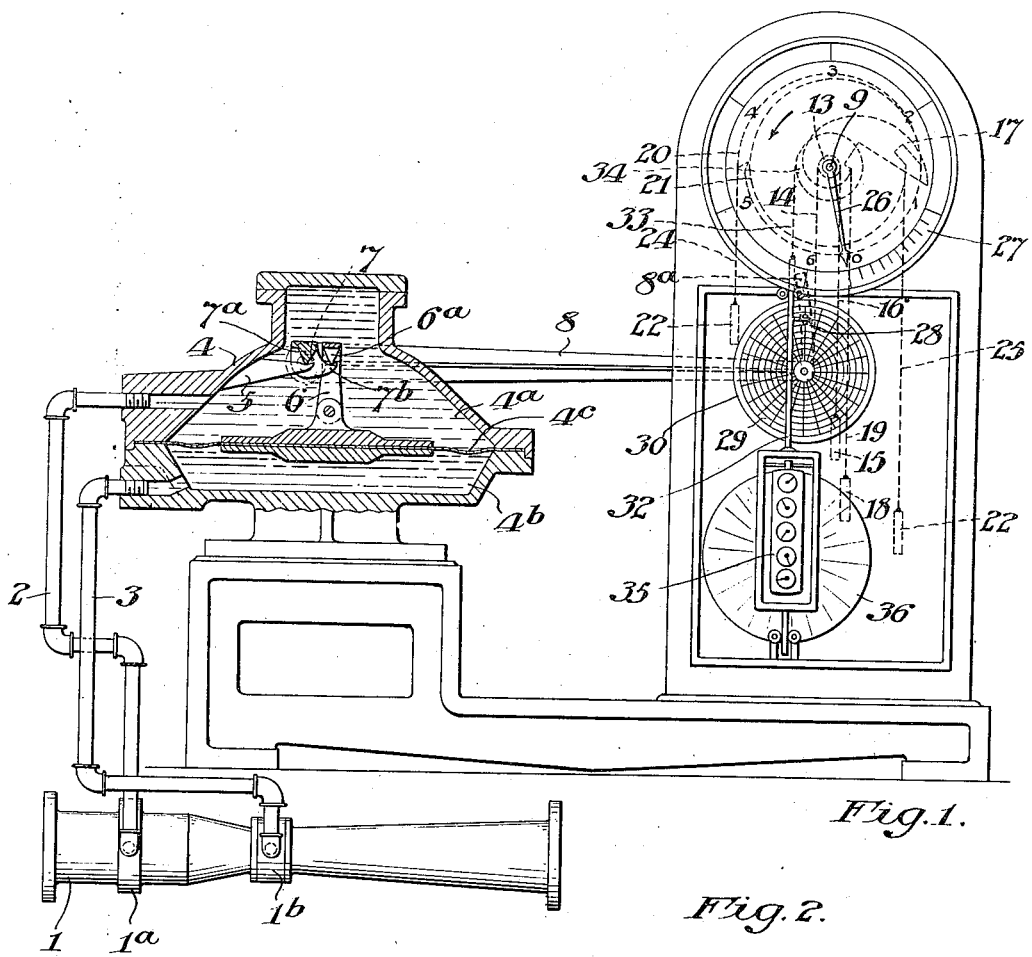
Fig. 1.
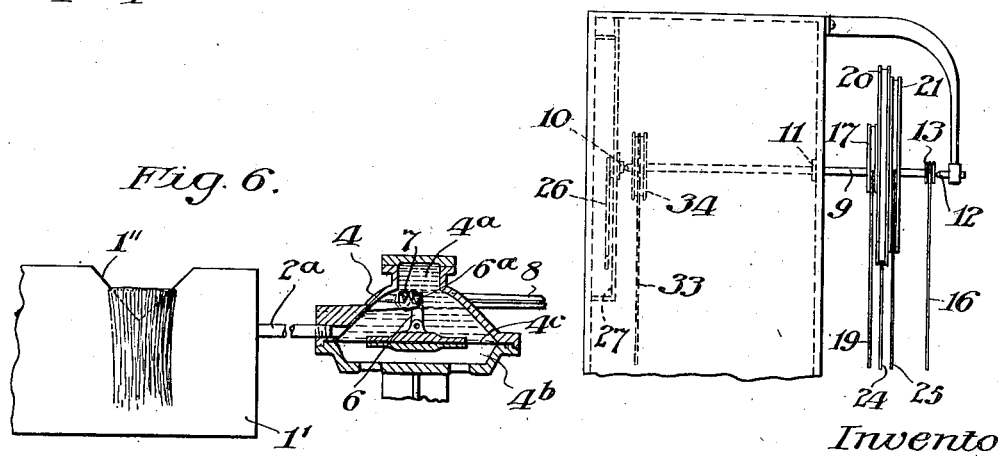
Fig. 6.
Fig. 2.
Inventor:
John W. Ledoux,
By C. N. Butler
Attorney

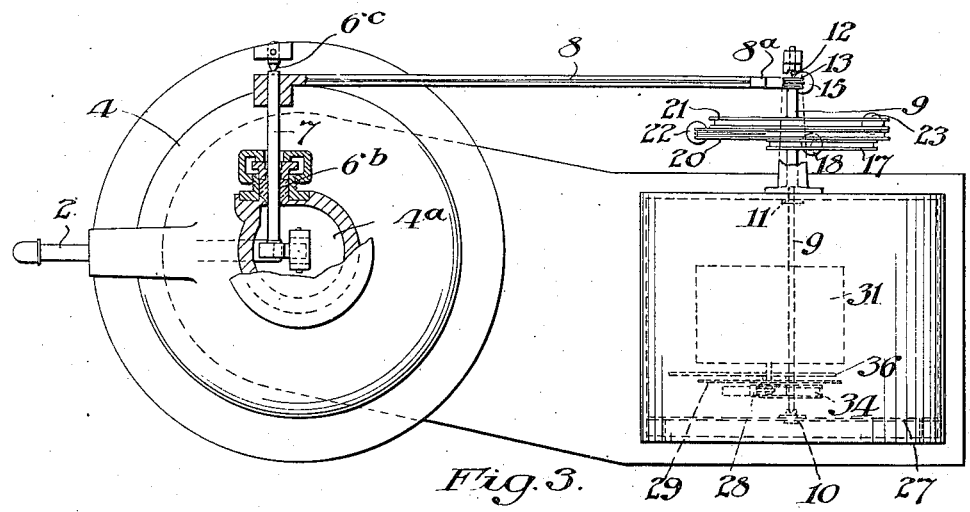
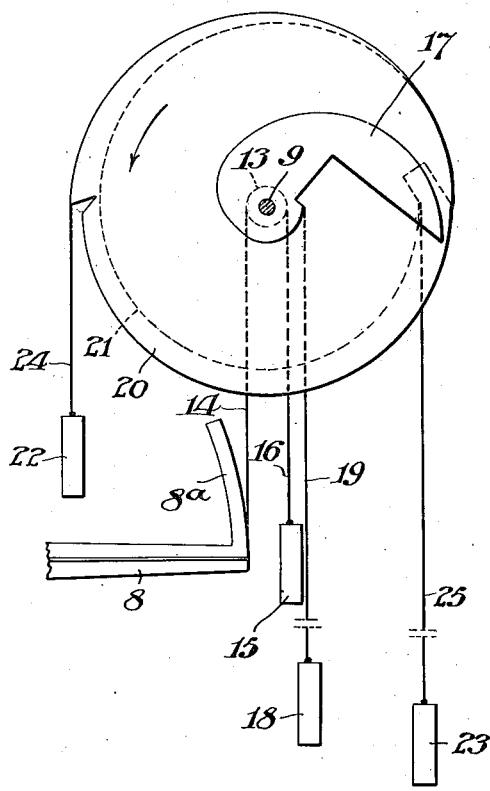
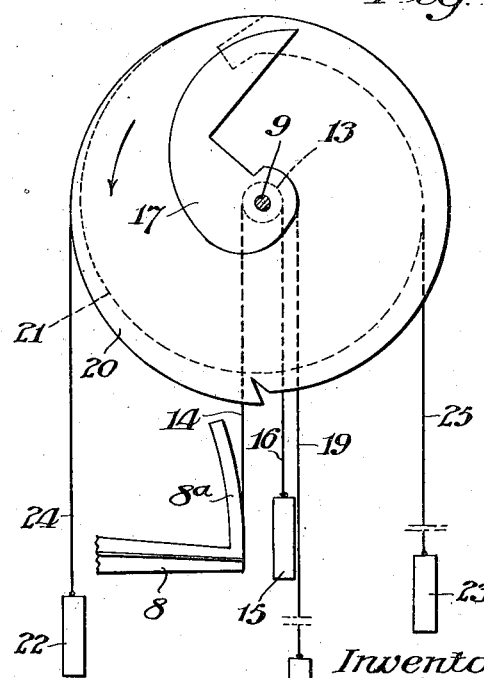

UNITED STATES PATENT OFFICE.

JOHN W. LEDOUX, OF SWARTHMORE, PENNSYLVANIA.

FLUID-METER.

1,243,842.   Specification of Letters Patent.   Patented Oct. 23, 1917.

Application filed February 4, 1916. Serial No. 76,095.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

This invention is a fluid meter having as its primary object the provision of improved means for accurately measuring the flow throughout the range of operation between the minimum and the maximum.

The flow in conduits, such as Venturi tubes, weirs, orifices, &c., varies as some function of the head which causes such flow, and the purpose of this invention is to indicate, by simple and accurate mechanism, desired functions of the head, as the head or flow of a fluid. This result has been obtained heretofore through mechanisms that are objectionable because complex, costly or inefficient.

The present invention provides improved means of simple, inexpensive, accurate and efficient character adapted for directly indicating heads and translating the forces due to changes in the pressure or head of a flowing fluid into a movement which is in direct proportion to changes in the velocity of the fluid to be measured.

The nature and advantages of my improvements will be fully understood by reference to the following description and the accompanying drawings in illustration thereof.

In the drawings, Figure 1 is a part sectional elevation of mechanism embodying a form of my improvements; Fig. 2 is a side elevation of part of the mechanism shown in Fig. 1; Fig. 3 is a part sectional plan view of mechanism shown in Fig. 1; Fig. 4 is a sectional elevation on an enlarged scale of detached mechanism embodied in the construction shown in Fig. 1; Fig. 5 represents a second position of the construction shown in Fig. 4; and Fig. 6 is a part sectional elevation of details used in connecting my improvements with a conduit comprising a weir.

The mechanism, in the form selected for illustration by Figs. 1 to 5 inclusive, comprises a conduit 1 having its parts $1^a$ and $1^b$, of different cross sectional areas, connected by the ducts 2 and 3 with the respective chambers $4^a$ and $4^b$ which are separated by a diaphragm $4^c$ in a casing 4, the diaphragm having the function of transmitting the resultant or differential of the pressures communicated through the ducts.

A bearing 5 and a bearing 6, having a knife edge $6^a$, are fixed to the case and diaphragm respectively, within the chamber $4^a$. A shaft 7 is journaled in a bearing $6^b$ of the case, has an end bearing against the arbor $6^c$ carried by the case, is provided with a knife edge bearing $7^a$ which rests on the bearing 5 and has a bearing $7^b$ on which rests the knife edge $6^a$. An arm 8 is fixed at one end to the shaft 7 and is provided at its other end with a circular segment or arc $8^a$ having its center in the axis of the arm's oscillation.

A journaled shaft 9 (supported by the bearings 10, 11, and 12) has fixed thereon a sheave 13 over which passes a flexible tension member 14 to a fixed connection with the periphery of the segment $8^a$, so that the movement of the arm 8 between its limits will not deflect the tension member, the arm being counter-balanced by a constant force or weight 15 suspended from the periphery of the sheave by a flexible tension member 16.

A cam 17 is fixed on the shaft 9 and a constant force or weight 18 is suspended from the periphery of the cam by a flexible tension member 19, so that when the flow in the conduit 1 is near the minimum and the pressures communicated to the chambers $4^a$ and $4^b$ differ but slightly, the cam will occupy the position shown in Fig. 4, when the weight 18 has its shortest or approximately its shortest leverage. As the flow in the conduit rises, with a corresponding depression of the diaphragm $4^c$, the latter acts through the part 6 upon the lever 8 which acts through the parts 14, 13 and 9 to turn the cam 17 and thereby increase the lever arm of the weight 18 in approximate proportion to changes in the head or pressure, the forces transmitted through the member 14 between the diaphragm $4^c$ and the shaft 9 having substantially constant leverages.

While the radii of the cam 17 increase in the desired ratio for providing the weight 18 with the necessary leverages for effecting the desired movement of the shaft 9 proportionately to changes in the velocity of flow, such leverages cannot be utilized in the desired manner with a suspended weight throughout the movement of the cam because the actual leverages of the weight acting through the cam, after the latter has revolved through a substantial part of its course, increase too rapidly.

Hence it is necessary to compensate for this too rapid change of curvature. It is also desirable to compensate for the difficulties in providing the proper changes in leverages by the small radius section of the cam 17 when the rate of flow is low.

These compensations are obtained by means of the cams 20 and 21 which are fixed on the shaft 9 and provided with the respective weights 22 and 23, the weights being suspended from the peripheries of the respective cams by the flexible tension members 24 and 25.

It will be understood that my invention is not dependent upon the character of the conduit or passage through which the fluid flows, since the mechanism can be adjusted in accordance with the equation involved in the problem.

As illustrated in Fig. 6, the case 4 has its chamber $4^a$ connected by a duct $2^a$ with a conduit or dam $1'$ which discharges through a weir $1''$ of V-form, while the chamber $4^b$ is open to the atmosphere.

It will be understood that in the flow through the conduit 1, the head which induces the flow varies as the square of the rate of flow and that the rate of flow varies directly as the angle of movement of the shaft 9, the sheave 13, and the cams 17, 20, and 21 fixed on the shaft, wherefore the head varies directly as the square of the angular movement of the shaft.

In the triangular notch weir, the head varies directly as the 2/5th power of the rate of flow, and the rate of flow varies directly as the angular motion of the shaft and the parts fixed thereon.

Now the head multiplied by its constant leverage is equal to the product of a constant weight and variable leverages provided by the several cams and suspended weights. Hence by substituting for the head its equivalent, we have for the Venturi tube or Pitot tube constructions a variable cam leverage which is equal to a constant multiplied by the square of the angular movement of the shaft carrying the cam; and for the triangular notch weir a variable cam leverage which is equal to a constant multiplied by the two-fifth power of the angular motion of the cam.

The movement of the shaft 9 is indicated by a hand 26 fixed thereon and movable thereby over a graduated dial 27. This movement is also indicated and a record made by a marker 28 which is movable radially with reference to the graduated sheet 29 on a disk 30 turned at a constant rate by clock work 31, the marker being connected to a rod 32 suspended by a flexible tension member 33 which passes over a sheave 34 fixed on the shaft 9. The amount of flow is indicated in a known manner by the registering mechanism 35 which is carried by the rod 32 and operated by the constantly rotating disk 36 with reference to which the register moves radially.

The foregoing mechanism will be understood to effect the indication of variable presures through their operation of means comprising a revoluble element to which counterbalancing force is applied, at points varying in distance from the axis of revolution and in angular relation to a datum line, with changes in the pressures, such that the desired exponential function of the pressures is indicated.

Having described my invention, I claim:

1. In a meter, the combination of a liquid conduit, means movable by variations of head of liquid in said conduit, and a weight controlled oscillatory cam operated by said means and adapted for producing a variable resistance which effects its movement proportionately to changes of the flow of said liquid.

2. In a meter the combination of a fluid conduit, with an indicating device, and means for effecting the movement of said device to distances proportional to the flow of fluid in said conduit, said means comprising a revoluble shaft, a weight controlled cam fixed on said shaft whereby changing resistance is opposed to the revolution thereof as the velocity of flow changes and weighted compensating cam mechanism for regulating said revolution.

3. In mechanism for effecting the indication of variable pressures, means comprising a revoluble element adapted to be turned by varying pressures and means for applying counter-balancing forces to said element at points distant from its axis of revolution and in angular relation to a datum line varying with changes in said pressures, such that the turning movement of said element is an exponential function of said pressures.

In testimony whereof I have hereunto set my name this 3rd day of February, 1916.

JOHN W. LEDOUX.